April 17, 1945. A. J. QUINBY 2,373,778
DISPLAY DEVICE
Filed Dec. 2, 1942 5 Sheets-Sheet 1
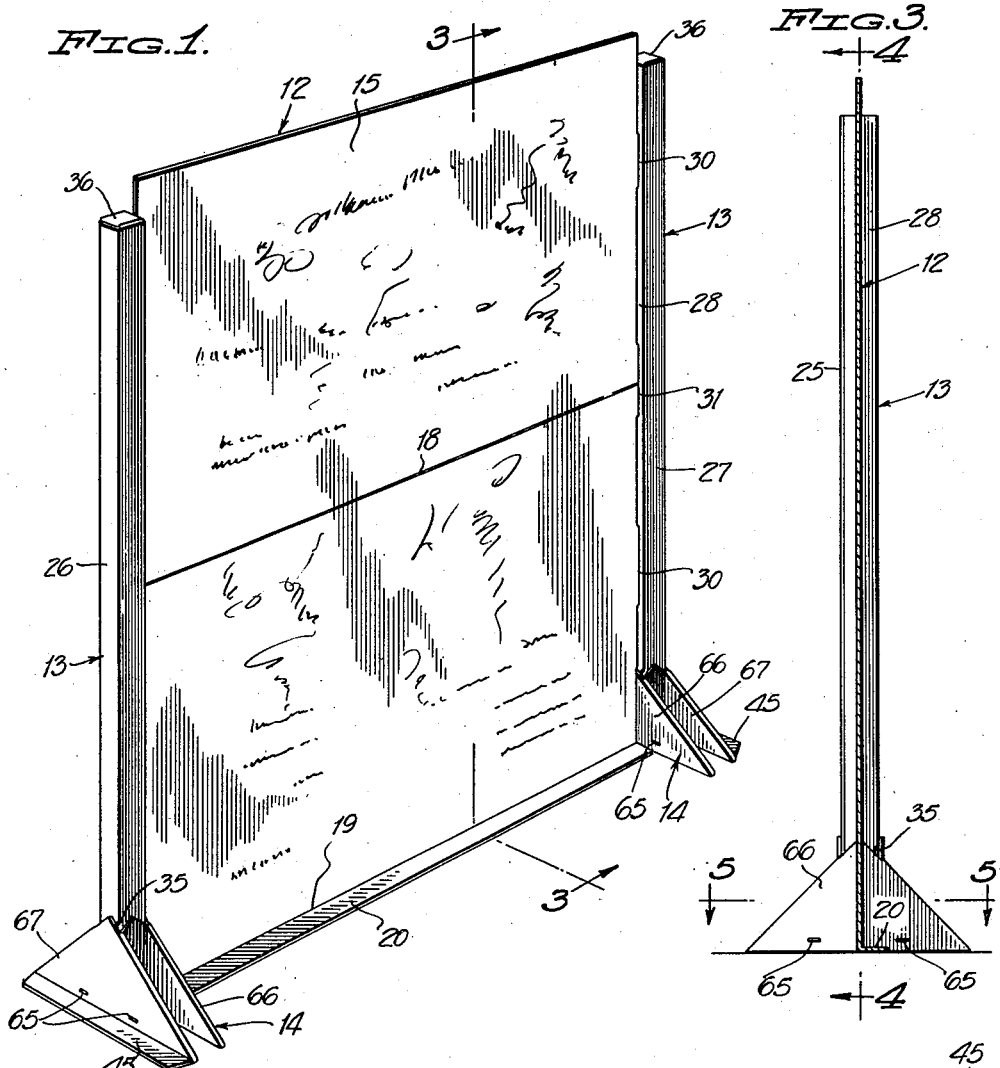
INVENTOR.
ALBERT J. QUINBY.
BY
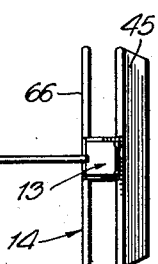
ATTORNEYS.
WITNESS:
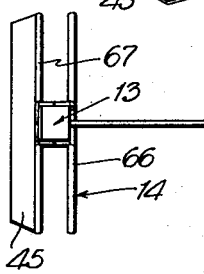

April 17, 1945.   A. J. QUINBY   2,373,778
DISPLAY DEVICE
Filed Dec. 2, 1942   5 Sheets-Sheet 2
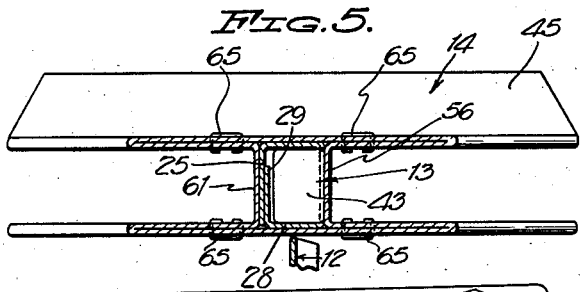
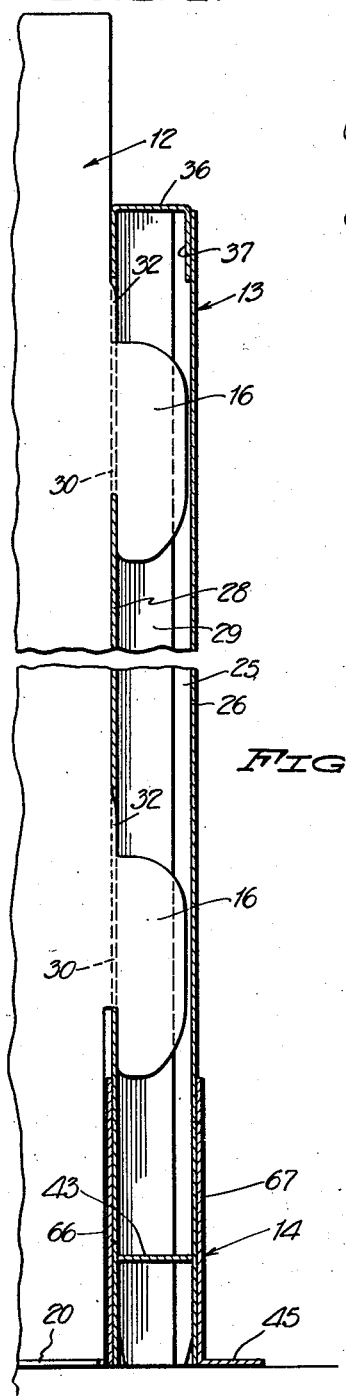
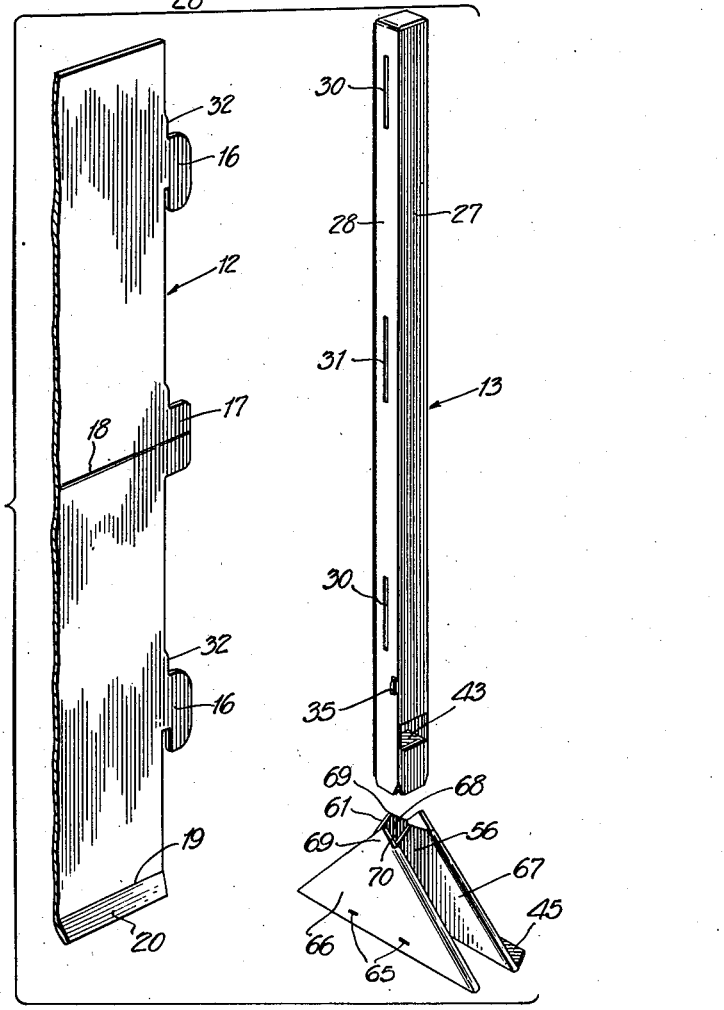
INVENTOR.
ALBERT J. QUINBY.
BY
ATTORNEYS.

April 17, 1945.  A. J. QUINBY  2,373,778
DISPLAY DEVICE
Filed Dec. 2, 1942    5 Sheets-Sheet 3
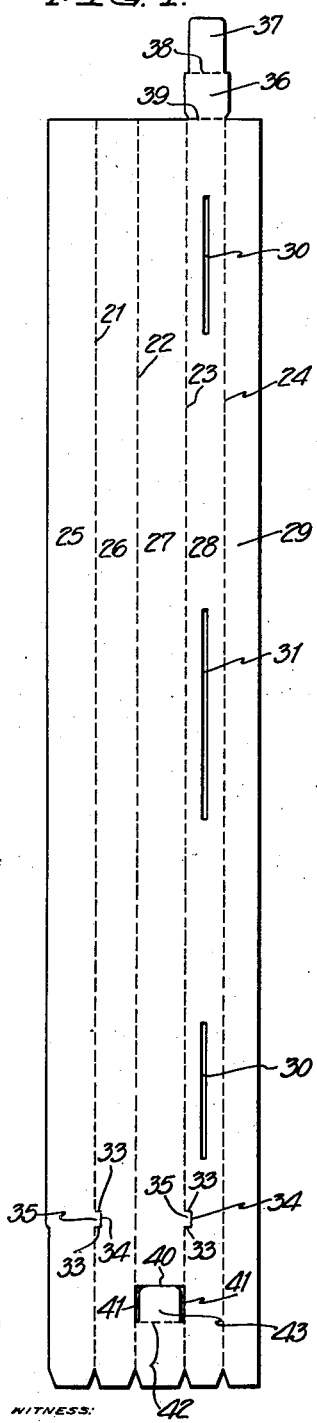
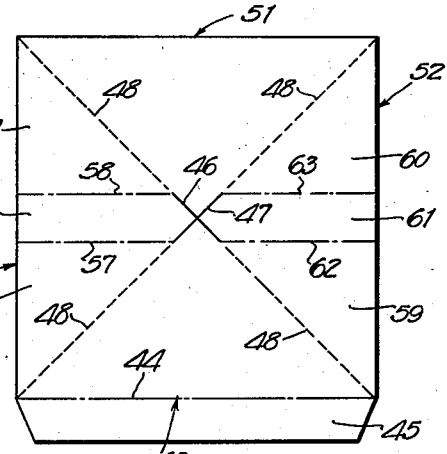
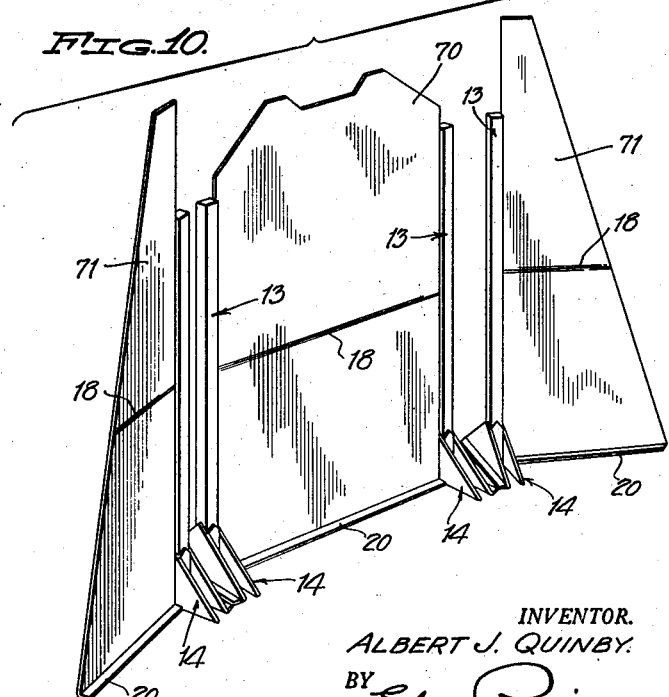
INVENTOR.
ALBERT J. QUINBY.
BY
ATTORNEYS.

April 17, 1945.　　A. J. QUINBY　　2,373,778
DISPLAY DEVICE
Filed Dec. 2, 1942　　5 Sheets-Sheet 4
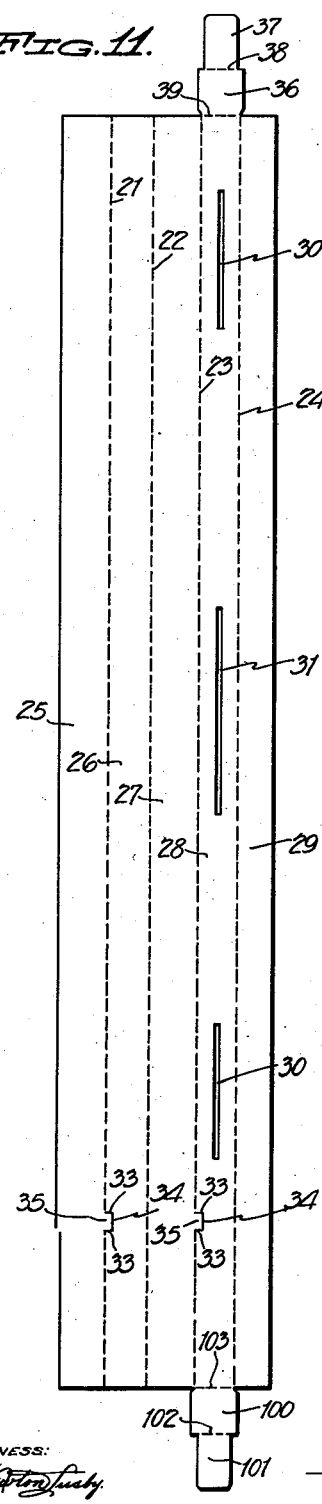
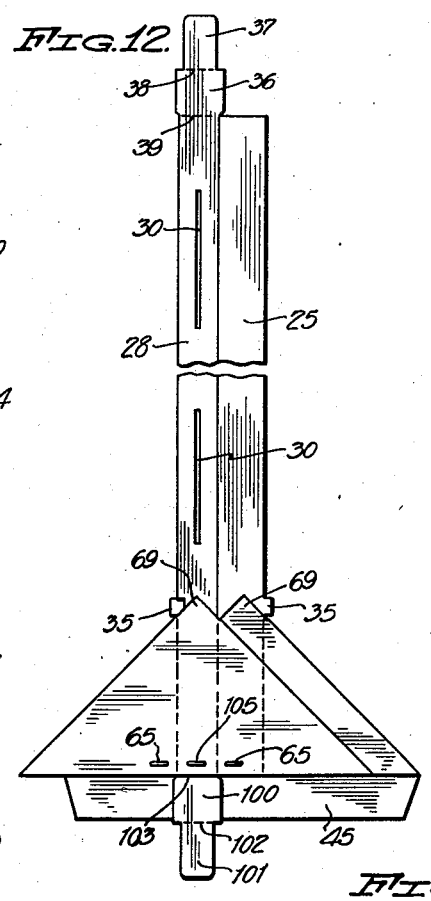
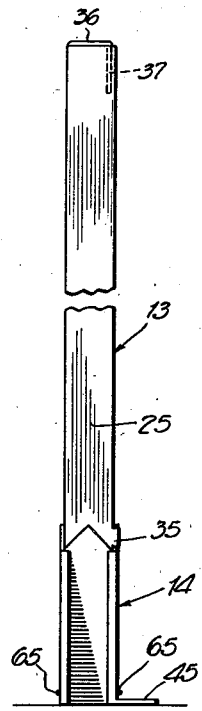
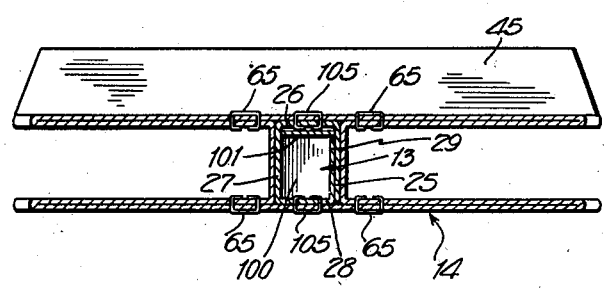
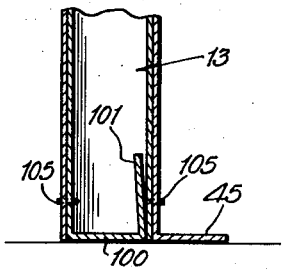
INVENTOR.
ALBERT J. QUINBY
BY
ATTORNEYS.

April 17, 1945.　　　　A. J. QUINBY　　　　2,373,778
DISPLAY DEVICE
Filed Dec. 2, 1942　　　　5 Sheets-Sheet 5
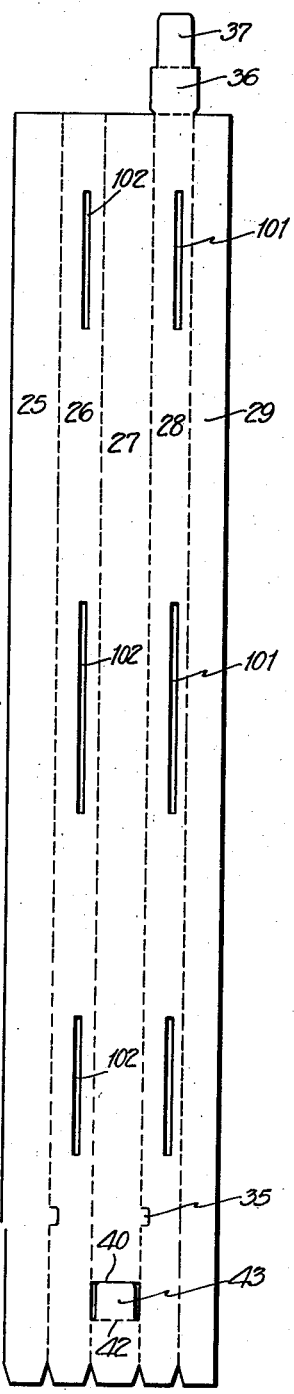
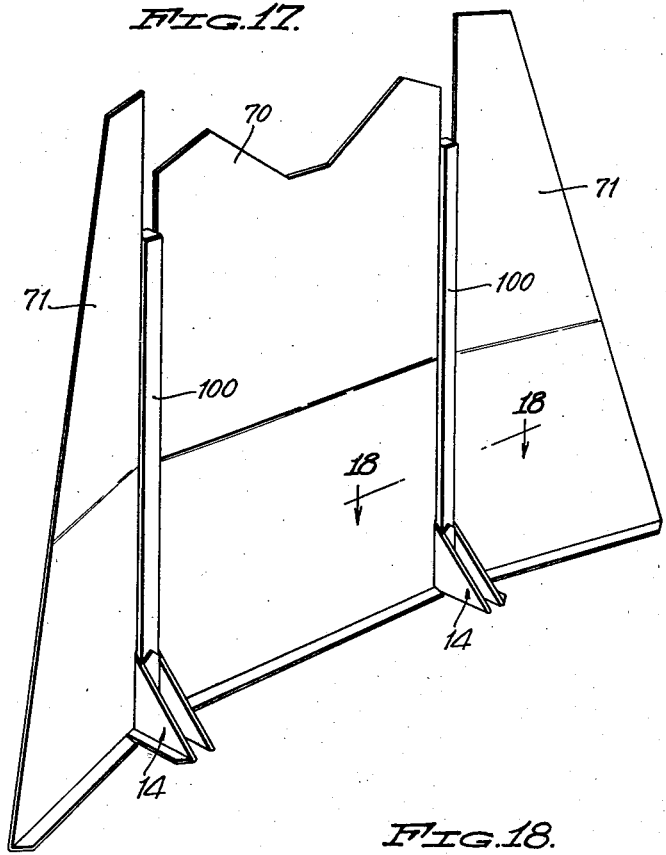
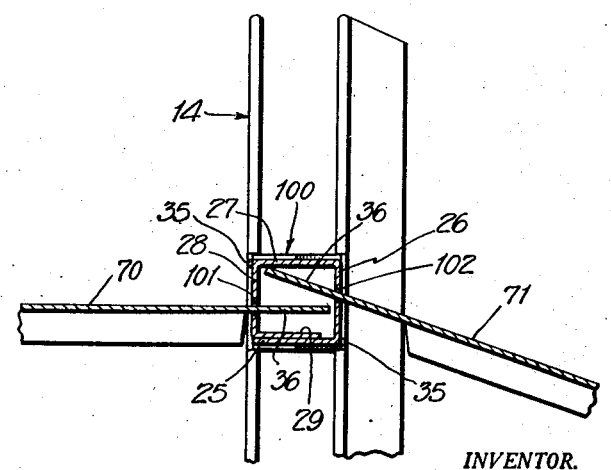
INVENTOR.
ALBERT J. QUINBY.
BY
ATTORNEYS.

Patented Apr. 17, 1945

2,373,778

UNITED STATES PATENT OFFICE 2,373,778

DISPLAY DEVICE

Albert J. Quinby, New York, N. Y., assignor to Display Finishing Company, Inc., Long Island City, N. Y.

Application December 2, 1942, Serial No. 467,625

8 Claims. (Cl. 40—125)

This invention relates to new and useful improvements in display devices of the type in which a display panel is supported in upright display position.

It is one object of the present invention to provide a novel construction of display panel and support therefor which will permit of display of either face of the display panel thus providing in effect, two displays, the manufacturing cost of which but slightly exceeds that of a single display.

It is another object of the invention, to pro- provide a display device of the aforementioned character which may be knocked down into relatively flat form for purposes of convenient transportation, or storing when not in use.

It is still another object of the invention to provide a device in which the setting up from knocked down form to display position is an extremely simple operation.

Other objects of the invention consist in the provision of a novel construction whereby the device may be employed singly as a unit, or may be employed as a combination of units to provide a composite display, which is of relatively low cost to manufacture and which materially reduces the cost of handling display devices.

With the above and other objects in view, reference will be had to the accompanying drawings, in which, Figure 1 is a perspective view illustrating a display constructed in accordance with one form of the present invention, Figure 2 is a top plan view thereof Figure 3 is a vertical sectional view taken substantially on the line 3—3 of Figure 1, Figure 4 is an enlarged vertical sectional view partly broken away, the view being taken substantially on the line 4—4 of Figure 3, Figure 5 is a horizontal sectional view on an enlarged scale, taken substantially on the line 5—5 of Figure 3.

Figure 6 is a distended perspective view illustrating one of the supporting columns, the collapsible supporting base therefor and one side edge portion of the display panel, Figure 7 is a plan view of the blank from which one of the supporting columns is formed, Figure 8 is a plan view of the blank from which a column supporting base is formed, Figure 9 is a plan view of a supporting base for one of the supporting columns, illustrating the same in its knocked down form, Figure 10 is a perspective view illustrating the manner in which the construction may be employed to provide a composite display, Figure 11 is a plan view illustrating a blank from which a modified form of supporting column may be formed, Figure 12 is a plan view illustrating a modified form of supporting column and supporting base therefor in which the supporting column and base are permanently secured together, the view being partly broken away and showing the column and its base in collapsed form, Figure 13 is a view in elevation, partly broken away illustrating the supporting column and the supporting base in the set up form.

Figure 14 is a horizontal sectional view taken through the supporting column and the base at a point immediately above the fastening means which secures them together, Figure 15 is a detail vertical sectional view taken centrally of the lower end of the supporting column, Figure 16 is a plan view of a blank employed in a still further modified form of the invention in which a three panel display is obtained by the use of two supporting columns instead of four columns as illustrated in Figure 10 of the drawings, Figure 17 is a perspective view illustrating a set up display of the three panel type employing but two supporting columns, and, Figure 18 is a transverse sectional view on an enlarged scale taken on the line 18—18 of Figure 17.

Referring to the drawings, the device as illustrated in Figures 1 through 9 thereof consists of a display panel 12, supporting columns 13 therefor, of which two are shown, and a supporting base 14 for each of the supporting columns 13.

The display panel 12, the supporting columns 13 and the supporting bases for the supporting columns are separate elements adapted to be removably connected together to form the display illustrated in Figure 1 of the drawings. These separate elements are preferably formed from paper board or similar foldable material but it is to be understood that other materials such as light sheet metals may also be employed since the construction readily lends itself to the use of such materials for displays wherein the collapsible or knock down feature is of no particular consequence.

The display panel 12 comprises a main body portion illustrated in Figure 1 as of rectangular form although it may, as illustrated in Figure 10, have an ornamental top edge if desired. The display panel is provided upon each of its side edges with hooked projections 16 which are spaced from each other as shown in Figure 6 of the drawings.

Each side edge of the display panel 12 is also formed with a projecting lug 17 disposed between the hooked projections 16 in spaced relation thereto.

When formed of paper board or similar foldable material and in relatively large sizes making it desirable to fold the display panel upon itself to facilitate transportation, the panel is provided with a transversely extending score line 18 which provides the means by which such folding may be accomplished. This score line 18 passes through the projecting lugs 17, the purpose of which detail of construction will be hereinafter specifically set forth. The display panel 12 may also be scored along its lower edge as at 19 to provide an extension 20 which serves as a foot or flange upon which the panel may rest to prevent any tendency on the part of the panel to sag when it is in display position.

The supporting columns 13 are of tubular construction and are herein illustrated as of rectangular cross-sectional form, although other cross-sectional forms may be employed so long as the tubular characteristic is retained.

These supporting columns are provided with longitudinally extending score lines of which there are four in the present embodiment of the invention. These score lines are designated 21, 22, 23 and 24 in Figure 7, and they extend parallel to each other, dividing the blank from which the supporting column is formed, into five sections or panels 25, 26, 27, 28 and 29.

The score lines 21—24 form the means upon which the blank is folded into tubular form of rectangular cross-sectional shape and also the means upon which the supporting column folds to collapsed position.

The section or panel 28 is provided with two end slots 30 which are adapted to receive the hooked projections 16 upon one side edge of the display panel 12 and an intermediate slot 31 for the reception of one of the projecting lugs 17 of the display panel when the latter is placed in display position between two of the supporting columns as illustrated in Figure 1 of the drawings.

When the display panel is placed in position between two of the supporting columns, the hooked projections 16 are positioned within their respective columns as shown in Figure 4 of the drawings and the edge of the display panel closely adjacent to each hooked projection may be formed with a slight projecting portion 32 which fills the upper portions of the slots 30 as shown in Figure 4 thus hiding these portions of the slots from view. The projecting lugs 17 will also be positioned in their respective slots 31 thereby to prevent any tendency of the display panel 12 to hinge upon the transverse score line 18 and thus provide sufficient rigidity to insure the panel retaining an upright display position.

The score lines 21 and 23 are interrupted near that end of the blank which forms the lower end of the supporting columns by spaced parallel cut lines 33 which extend respectively into the sections or panels 26 and 28 and in each case, these cut lines are connected by a cut line 34.

This construction provides a projection 35 which extends from each of two opposite corners of the supporting column when the blank is folded to form the tubular structure. The specific purpose of these projections 35 will be hereinafter described.

To form the tubular supporting column, the blank is folded upon its several score lines 21—24 bringing the sections or panels 25 and 29 into overlapping position in which position they are secured together by a suitable adhesive or in any other desired manner.

Projecting from the upper end of the section or panel 28 there is an extension 36 which has a reduced outer end portion 37. This extension is transversely scored as at 38 and hinges relatively to the section or panel 28 by means of a score line 39.

The extension 36 serves to close the upper end of the supporting column, the reduced portion 37 of the extension forming a tuck-in tab which enters the open end of the supporting column to retain the extension 36 in end closing position and to lend rigidity to the upper end of the supporting column.

The lower end of the supporting column is open and to provide rigidity to this portion thereof, the section or panel 27 is cut along the lines 40 and 41 and scored along the line 42 to provide a tongue or flap 43 of the proper size to bridge the internal dimension of the supporting column when hinged inwardly of the column upon the score line 42.

The extension 36 when its tuck-in flap 37 is positioned within the open end of the column together with the tongue or flap 43 serve to maintain the supporting column in its true rectangular cross-sectional form and to provide the desired rigidity to maintain the column in its true cross-sectional shape or form when set up.

Each of the panel supporting columns 13 is removably mounted in a suitable supporting base 14 and the construction of one of these supporting bases will now be described.

A supporting base is formed from a single blank of paper board which is shown in Figure 8 as being of substantially rectangular form.

The blank is illustrated in Figure 8 with its front face exposed to view and is scored along the line 44, preferably in the form of a crease score upon the rear face of the blank to form an extending flange 45 which hinges upon the score line 44 in a manner and for a purpose to be hereinafter described.

This construction provides a square area which is defined upon three sides by three side edges of the blank and on the fourth side by the score line 44.

Disposed centrally of the square area aforementioned, there are two relatively short intersecting slits 46 and 47 which extend entirely through the blank, the intersection of these slits being located at the center point of said square area.

Extending from the outer ends of each of the slits 46 and 47 to its respective corner of the square area of the blank there is a score line 48, preferably in the form of a cut score upon the front face of the blank. These score lines 48, together with the intersecting slits 46 and 47, divide the square area of the blank into four triangular areas 49, 50, 51 and 52.

The triangular area 50 is divided into two triangular panels 53 and 54 and an intermediate trapezoidal panel 56 by means of two spaced score lines 57 and 58 preferably in the form of crease score lines upon the rear face of the blank. These score lines 57 and 58 extend in spaced parallel relation from the left hand ends of the slits 46 and 47 in Figure 8 of the drawings, to the outer edge of the triangular area 50.

The triangular area 52 which is opposed with respect to the triangular area 50 is similarly divided into two triangular panels 59 and 60 and an intermediate trapezoidal panel 61 by means of two spaced score lines 62 and 63 preferably in the form of crease score lines upon the rear face of the blank. These score lines 62 and 63 extend in spaced parallel relation from the right hand ends of the slits 46 and 47 to the outer edge of the triangular area 50.

After the blank has been cut and scored as described, it is folded upon all of its score lines to provide a column supporting base 14 and the manner in which it folds and the form which it takes in its folded position will now be described.

Application of pressure upon the rear of the blank at the point of intersection of the slits 46 and 47 will cause the blank to hinge upon the score lines 48, 57, 58, 62 and 63.

The several panels of the blank are hinged upon their respective score lines until the rear faces of the triangular panels 53 and 59 contact the rear face of the triangular area 49 and the rear faces of the triangular panels 54 and 60 contact the rear face of the triangular area 51. In this position of the parts, the triangular panels 53, 59 are secured to the triangular area 49 and the triangular panels 54 and 60 are secured to the triangular area 51 preferably by stitches or the like, 65.

The resultant structure is best illustrated in Figure 6 and by reference to said figure, the column supporting base will be seen to comprise two spaced triangularly shaped upstanding walls 66 and 67 hingedly connected together by the trapezoidal panels 56 and 61 which are also spaced from each other and which together with the upstanding side walls form a relatively deep well 68 for the reception of the lower end of the supporting column 13.

This position of the supporting base member is the folded position referred to hereinafter in the claims and in such position the upstanding side walls 66 and 67 and the trapezoidal panels 56 and 61 have reduced extensions 69 and intervening spaces 70 therebetween.

The lower end of the column 13 is inserted into the well-like recess 68 to a point where the two opposed projections 35 heretofore mentioned engage the bottoms of their respective intervening spaces between two of the extensions 69 of the upstanding side walls and the trapezoidal panels at which time, the lower end of the supporting column will be substantially flush with the lower edges of the upstanding side walls and those of the trapezoidal panels. Thus, the projections 35 form stops to limit the movement of the supporting column inwardly of the supporting base to insure proper relative positioning of these two elements relatively to each other.

In the column supporting position of the base, the flange 45 provides additional support for the base as illustrated in Figure 1 of the drawings.

In its folded position just described and with the supporting column removed therefrom, the supporting base has a natural tendency to collapse by hinging of the trapezoidal panels 56 and 61 upon their respective score lines 57, 58, 62 and 63 and by the application of slight pressure upon the triangular upstanding side walls, the supporting base may be completely collapsed to the flat form illustrated in Figure 9 of the drawings.

It is to be understood that the deep well 68 and the supporting column are of the same cross-sectional shape or form and are of such dimension that the column fits snugly in the supporting base, and that the natural tendency of the base to collapse is overcome by the presence of the column in the deep well 68 of the supporting base.

In Figure 10 of the drawings there is illustrated a composite display comprising a centrally disposed, relatively large display panel 70 and two relatively smaller side panels 71.

This Figure 10 illustrates one manner of use of the supporting columns and their supporting bases in constructing a composite display.

By reference to Figure 10, it will be noted that the centrally disposed display panel 70 and the supporting columns and supporting bases therefor are of substantially the same construction as in the heretofore described form of the invention.

The side panels 71, however, are relatively smaller and are capable of support in display position.

These side panels have all of the characteristic features of the main display panel except that they are provided with the hooked projections 16 and the projecting lug 17 upon one edge only, since but one supporting column and but one supporting base therefor are employed in supporting panels of relatively smaller size, in display position.

In Figures 11 through 14 of the drawings, there is illustrated a modified form of supporting column and column supporting base in which these two elements are permanently attached to each other instead of being separate parts as in the heretofore described form of the invention.

The supporting column of this modified form of the invention is formed from the blank illustrated in Figure 11 of the drawings.

By comparison with Figure 7, it will be apparent that the blank of Figure 11 is the same as that employed in the heretofore described form, except that the bridge flap 43 in the panel 27 is eliminated.

In the blank of the modified form of supporting column the lower end of the panel 28 is constructed in the same manner as the upper end thereof.

Projecting from the lower end of the panel 28 there is an extension 100 which has a reduced portion 101. A score line 102 provides a hinged connection between the reduced portion 101 and the extension 100 is hingedly connected to the main body portion of the blank by a score line 103.

In this form of the invention, the extension, the reduced portion of the extension 100 folds into the lower end of the supporting column to maintain the column in its folded form.

The supporting base is identical in form to the one described heretofore and when the supporting column is formed from its blank in the heretofore described manner and inserted into the column receiving opening of the base, it may be secured permanently thereto by means preferably in the form of staples or stitches 105, which pass through the supporting base and the column at oppositely disposed points as best illustrated in Figure 14 of the drawings.

In this form of the invention, when the reduced portion 101 of the extension is tucked into the lower end of the column, sufficient rigidity is provided in the lower end of the column to maintain the column and the base in its folded or set up position. To collapse the column and base, it is only necessary to remove the reduced portions of the extensions 36 and 100 from their respective ends of the column after which, slight pressure thereon will collapse the column and base to the positions shown in Figure 12 of the drawings.

Manipulation of the extension 100 is a comparatively simple operation since in this form of the invention, it is located at the lower end of the supporting column.

In Figure 17 of the drawings, there is illustrated another form of three panel display which is similar to the display illustrated in Figure 10.

In the form illustrated in Figure 17, there is a central panel 70 and two side panels 71, the difference being that there are but two columns and two supporting bases employed.

The panels 70 and 71 and the supporting bases for the supporting columns are of the same construction as the corresponding parts in the heretofore described forms of the invention. The supporting columns, however, differ slightly in construction and this difference will now be described.

The two supporting columns in this modified form of the invention are designated 100—100, and by reference to Figure 16 it will be noted that the blanks from which these supporting columns are formed are, with two exceptions, the same as the blank illustrated in Figure 7 from which the supporting columns 13 are formed.

One of these exceptions is that in lieu of the slots 31 being positioned centrally of the transverse dimension of the panel 28, three slots 101 are employed which are disposed slightly to the right of the center of the transverse dimension of the panel.

The other exception is that the panel 26 of the blank is formed with three slots 102 which are also positioned slightly to the right of the center of the transverse dimension of the panel.

This arrangement of slots 101 and 102 provides, when the blank is folded to form the supporting column, slots upon two opposite side faces of the column for the reception of the hooked extensions 16 and the projecting lugs 17 of the display panels 71.

By reason of the arrangement of the slots 101 and 102 as above described, they do not fall opposite to each other, when the supporting panel is formed. Instead, they are slightly off-set with respect to each other which permits of the hooked extensions 16 and projecting lugs 17 of the display panels 70 and 71 passing through their respective slots as illustrated in Figure 18 of the drawings.

Thus, it will be obvious that this last described form of the invention provides a three panel display in which but two supporting columns and but two column supporting bases are required to support the same in display position.

From the foregoing it will be apparent that the present invention provides a new and novel construction in display devices of the panel type which construction lends itself readily to various forms of single or composite displays.

The construction is also highly economical in production since all of the several parts or elements, with the exception of the panels are decorated upon but one face thereof.

The construction also provides a double display at little more expense than a single display, the only additional expense being the decoration of the opposite sides of the panels. It will be understood, of course, that when the main display panel of a composite display such as illustrated in Figure 10 of the drawings is reversed to display a change in copy, it may be desirable to reverse the positions of the side panels 71. In fact this would be necessary only when a change of display of copy is desired with respect to said side panels.

National advertisers employ window dressing services to set up displays in various territories and a double display of the type herein set forth not only reduces the required number of displays by half, but reduces this service by half and therefore results in a saving to the advertiser in service as well as cost.

It will thus become apparent that the several objects recited are accomplished by the constructions herein set forth.

Having thus described the invention, what is claimed as new is:

1. A display panel supporting column comprising in combination, a collapsible tubular member and a separate supporting base therefor, said collapsible tubular member comprising a blank of foldable material scored to permit collapsing thereof into flat form, said supporting base comprising a blank of foldable material scored and cut to provide when the blank is folded upon its scored lines, a plurality of upstanding walls and an opening for the reception of one end of the collapsible tubular member, and means for limiting the movement of the collapsible tubular member in one direction relative to the supporting base.

2. A display panel supporting column comprising in combination, a collapsible tubular member and a separate collapsible supporting base therefor, said collapsible tubular member comprising a blank of foldable material scored to permit collapsing thereof into flat form, said collapsible supporting base comprising a blank of foldable material scored and cut to provide when folded upon its scored lines, a plurality of upstanding walls and an opening for reception of one end of the collapsible tubular member, means for securing the blank in its folded position, and means for limiting the movement of the collapsible tubular member in one direction relative to the supporting base.

3. A display panel supporting column comprising in combination, a collapsible tubular member and a separate supporting base therefor, said collapsible tubular member comprising a blank of foldable material scored to permit collapsing thereof into flat form, said supporting base comprising a blank of foldable material scored and cut to provide when folded upon its scored lines, a plurality of spaced upstanding walls each of which is angularly disposed with respect to its next adjacent wall on each side thereof and a tubular member receiving opening, projections extending from the upper edge of each of said upstanding walls, means for securing the blank in its folded position, and projections extending from the collapsible tubular member and adapted for reception between the projections of the upstanding walls for limiting the movement of the collapsible tubular member in the direction of the base.

4. A display panel supporting column comprising in combination, a collapsible tubular member and a separate collapsible suppporting base therefor, said collapsible tubular member comprising a blank of foldable material scored to permit collapsing thereof upon said score lines into flat form, said supporting base comprising a blank of foldable material scored and cut to provide when the blank is folded upon its score lines, a plurality of spaced upstanding walls each of which is angularly disposed with respect to its next adjacent wall on each side thereof and a tubular member receiving opening, means for retaining the blank in its folded form, reduced extensions projecting from the upper edge of each of said side walls, and a lug or projection extending from the collapsible tubular member and adapted for reception in the space between the reduced extensions of two of said side walls to limit the movement of the tubular member within the opening in the supporting base.

5. A display panel supporting column, comprising in combination, a collapsible tubular member and a separate collapsible supporting base therefor, said collapsible tubular member comprising a blank of foldable material scored to permit collapsing thereof into flat form, said supporting base comprising a rectangular blank of foldable material, a plurality of intersecting cut lines located substantially centrally of the blank, a score line extending from each end of each of the intersecting cut lines to its respective corner of the blank and dividing the blank into triangular areas, reverse score lines extending in spaced parallel relation from the ends of the cut lines through each of two opposed triangular areas of the blank, said intersecting cut lines and said score lines providing means upon which the blank may be folded to form a supporting base member having two relatively large spaced parallel upstanding walls and two relatively smaller parallel connecting walls disposed in right angular relation to the first mentioned walls, and a receiving passage for receiving one end of the collapsible tubular member, and means for retaining the blank in its folded form.

6. A display panel supporting column comprising in combination, a collapsible tubular member and a separate collapsible base therefor, said collapsible tubular member comprising a blank of foldable material scored to permit collapsing thereof into flat form, said supporting base comprising a rectangular blank of foldable material, a plurality of intersecting cut lines, located substantially centrally of the blank, a face score line extending from each end of each of the intersecting cut lines to its respective corner of the blank and dividing the blank into triangular areas, reverse score lines extending in spaced parallel relation to each other from the ends of the cut lines through each of two opposed triangular areas of the blank and dividing each of said areas into two triangular panels and an intermediate trapezoidal panel, said intersecting cut lines providing means upon which the blank may be folded to form a supporting base member having two relatively large spaced parallel upstanding walls and two relatively smaller walls formed by said trapezoidal panels for connecting said first mentioned wall and cooperating therewith to form a receiving passage for one end of the collapsible tubular member, said reverse scores also forming means upon which the base member may hinge from folded form to collapsed form and means for securing the blank in its folded form.

7. A display panel supporting column comprising in combination, a collapsible tubular member and a collapsible supporting base member, said collapsible tubular member comprising a blank of foldable material scored to permit collapsing thereof into flat form, said collapsible supporting base comprising a blank of foldable material scored and cut to provide when the blank is folded upon its scored lines, a plurality of upstanding walls and an opening for reception of one end of the collapsible tubular member, and means for permanently securing the collapsible column in the receiving opening of the collapsible supporting base member.

8. A supporting base member for upright columnar structures, said base member comprising a blank of foldable material, intersecting lines of cut located substantially centrally of the blank and extending through the same, a score line extending from the outer end of each of said intersecting lines of cut to the edges of the blank and forming continuations of the lines of cut, and a score line extending from the outer end of each of said lines of cut to each of two opposite side edges of the blank, said last mentioned score lines being arranged in two oppositely disposed pairs, said blank being foldable upon said score lines to provide a plurality of upstanding walls and an opening for the reception of a columnar structure, and means for securing the blank in its folded position.

ALBERT J. QUINBY.